United States Patent [19]

Oguri et al.

[11] 4,429,379

[45] Jan. 31, 1984

[54] DEVICE FOR CONTROLLING TONE ARM CARRYING MOVING COIL TYPE PICKUP

[75] Inventors: Katsuhiko Oguri, Fujisawa; Kazuhiro Sato, Sagamihara, both of Japan

[73] Assignee: Victor Company of Japan, Limited, Yokohama, Japan

[21] Appl. No.: 309,806

[22] Filed: Oct. 8, 1981

[30] Foreign Application Priority Data

Oct. 9, 1980 [JP] Japan ............................ 55-144547[U]

[51] Int. Cl.³ .......................... G11B 3/10; H04R 9/16
[52] U.S. Cl. ...................................... 369/220; 369/43; 369/147; 369/152; 369/221; 369/222; 369/251
[58] Field of Search ............... 369/215, 219, 220, 222, 369/233, 251, 43, 58, 147, 221, 146, 152

[56] References Cited

U.S. PATENT DOCUMENTS

| | | | |
|---|---|---|---|
| 4,102,536 | 7/1978 | Clunis ................................ | 369/233 |
| 4,105,961 | 8/1978 | Plummer et al. .................... | 369/215 |
| 4,209,670 | 6/1980 | Ona et al. ............................. | 369/147 |
| 4,301,528 | 11/1981 | Leri ..................................... | 369/233 |

FOREIGN PATENT DOCUMENTS 680028  8/1979  U.S.S.R. ................................ 369/43

OTHER PUBLICATIONS

Radio Shack Dictionary of Electronics, 1974–1975, p. 344.
McGraw-Hill Dictionary of Scientific and Technical Terms, 1974, p. 893.
McGuire et al., Anisotropic Magnetoresistance in ferromagnetic Alloys, IEEE Transactions on Magnetics, vol. Mag-11, No. 4, Jul. 1975, pp. 1018–1038.

Primary Examiner—Steven L. Stephan
Attorney, Agent, or Firm—Lowe, King, Price & Becker

[57] ABSTRACT

Moving coils of a phonograph pickup are made of a substance having magnetoresistance so that the electrical resistance of the coils are detected by means of bridge circuits. The amounts of resistance variation of the coils are used to produce a vertical component output signal and a horizontal component output signal which respectively indicate the vertical and horizontal displacements of the coils from its optimum operating point with respect to the magnetic field of the pickup. The vertical and horizontal component output signals are used to control vertical and horizontal control motors which correct the attitude of the tone arm so that the moving coils are accurately positioned at the optimum operating point irrespective of the warp and/or eccentricity of the phonograph disk.

8 Claims, 7 Drawing Figures

DEVICE FOR CONTROLLING TONE ARM CARRYING MOVING COIL TYPE PICKUP

BACKGROUND OF THE INVENTION

This invention generally relates to a device for controlling the tone arm of a record player, and more particularly, the present invention relates to a device for controlling vertical and/or horizontal attitudes of the tone arm equipped with a moving coil type pickup.

In a record player having a pickup of moving coil type, the vertical and horizontal positions of the moving coil with respect to the provided magnetic field of the pickup has to be controlled so that the moving coil, which generates an output voltage indicative of the picked up information, is kept at an optimum position with respect to the magnetic field irrespective of the warp or curve of the playing phonograph disk. Namely, if the moving coil operates off the optimum position, the output signal from the pickup would be distorted.

In some conventional record players, the output signal of the moving coil type pickup is processed to produce a tone arm control signal. The vertical and horizontal position of the moving coil with respect to the yoke is thus controlled so that the moving coil(s) is(are) always kept at a right position irrespective of the warp and/or eccentricity of the disk. However, since the moving coil per se produces its output signal which is in proportion to the moving velocity thereof, the low frequency output voltage indicative of the warp of the disk available for controlling the arm is very low. For this reason, in the conventional record players, the position of the moving coil could not be accurately controlled to the optimum position especially in the case that the up-down frequency of the moving coil is very low.

SUMMARY OF THE INVENTION

It is, therefore, an object of the present invention to provide a device for controlling the tone arm carrying a moving coil type pickup so that the position of the moving coil(s) is accurately controlled irrespective of the moving velocity of the coil(s), for generating audio signals without distortion which is caused by irregular shape of disk.

Another object of the present invention is to provide such a device so that the output signal of the moving coil of the pickup is not distorted even when the stylus traces a phonograph disk having a warp and/or eccentricity.

In accordance with the present invention there is provided a device for controlling a tone arm carrying a moving coil type pickup, comprising: (a) moving coil assembly having left and right channel moving coils arranged to move in a magnetic field in accordance with the vibration of a cantilever having a stylus, each of said moving coils being made of a substance having magnetoresistance; (b) a tone arm vertically and horizontally rotatably mounted on a stationary member, said tone arm carrying said moving coil assembly; (c) a tone arm control mechanism for controlling the vertical and/or horizontal attitude of said tone arm; (d) first means for detecting the variation in the electrical resistance of said left channel moving coil; (e) second means for detecting the variation in the electrical resistance of said right channel moving coil; (f) third means responsive to the detected resistances from said first and second means for generating a vertical component output signal indicative of the vertical displacement of said moving coil assembly with respect to said magnetic field and/or a horizontal component output signal indicative of the horizontal displacement of said moving coil assembly with respect to said magnetic field; and (g) fourth means responsive to said vertical component output signal and/or horizontal component output signal for generating a vertical control signal and/or a horizontal control signal which is/are applied to said tone arm control mechanism for controlling the vertical and/or horizontal attitude(s) of said tone arm so that each of said left and right channel moving coils are positioned at optimum operating point with respect to said magnetic field.

BRIEF DESCRIPTION OF THE DRAWINGS

The objects and features of the present invention will become more readily apparent from the following detailed description of the preferred embodiment taken in conjunction with the accompanying drawings in which.

DETAILED DESCRIPTION OF THE INVENTION

Prior to describing the embodiment of the present invention, the above-mentioned conventional record player is discussed for better understanding of the objects and features of the present invention.

Figure 1:
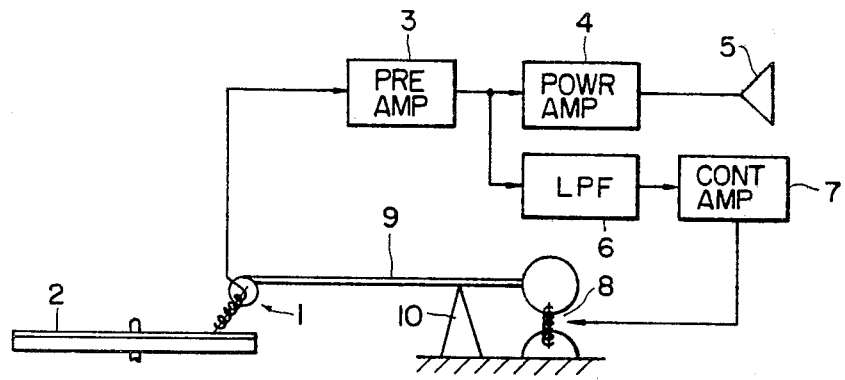
FIG. 1 is a schematic block diagram of the conventional phonograph record reproducing system.

FIG. 1 illustrates a schematic diagram of the conventional record player in which the tone arm is controlled in accordance with the output signal of the moving coil of the pickup. The pickup 1 attached to the tone arm 9 has a stylus arranged to trace the sound groove of the phonograph disk 2 positioned on the turntable (no numeral). The output signal from the moving coil of the pickup, where the coil vibrates or displaces while playing the disk 2, is fed to a preamplifier 3 whose output is connected to the input of a following power amplifier 4. The power amplifier 4 drives a speaker 5 so that sound is reproduced. The output signal of the preamplifier 3 is futher applied via a low pass filter 6 to a control amplifier 7 in which a control signal is generated. Since audio signal components are blocked by the low pass filter 6, only low frequency components indicative of the warp of the phonograph disk 2 are applied to the control amplifier 7, and the control amplifier 7 generates a control signal, with which an arm amplitude control device 8 having, for instance, a magnetic circuit and a coil, is actuated to control the vertical attitude of the tone arm 9. Thus, the tone arm 9 slightly rotates about a pivot 10 so that the displacement of the moving coil is corrected. Namely, the distance between the surface of the disk 2 and the pickup 1 is kept constant irrespective of the warp of the disk 2.

From the foregoing it will be understood that in the conventional circuit arrangement, the output signal of the pickup is directly processed to derive the low frequency components indicative of the warp of the disk 2, where the voltage of low frequency components is apt to be insufficient to cause the control amplifier 7 to drive the attitude control device.

In contrast with such a conventional arrangement, according to the present invention the moving coil(s) of the pickup is/are made of a substance having magnetoresistance so that the electrical resistance of the moving coil varies in accordance with the position of the moving coil. Namely, in the present invention, the position of the moving coil is detected by applying a D.C. voltage to the moving coil to see the variation in electrical resistance of the moving coil, while the A.C. components indicative of the picked up information is fed to the preamplifier in the same manner as in the conventional record player.

Figure 2A:
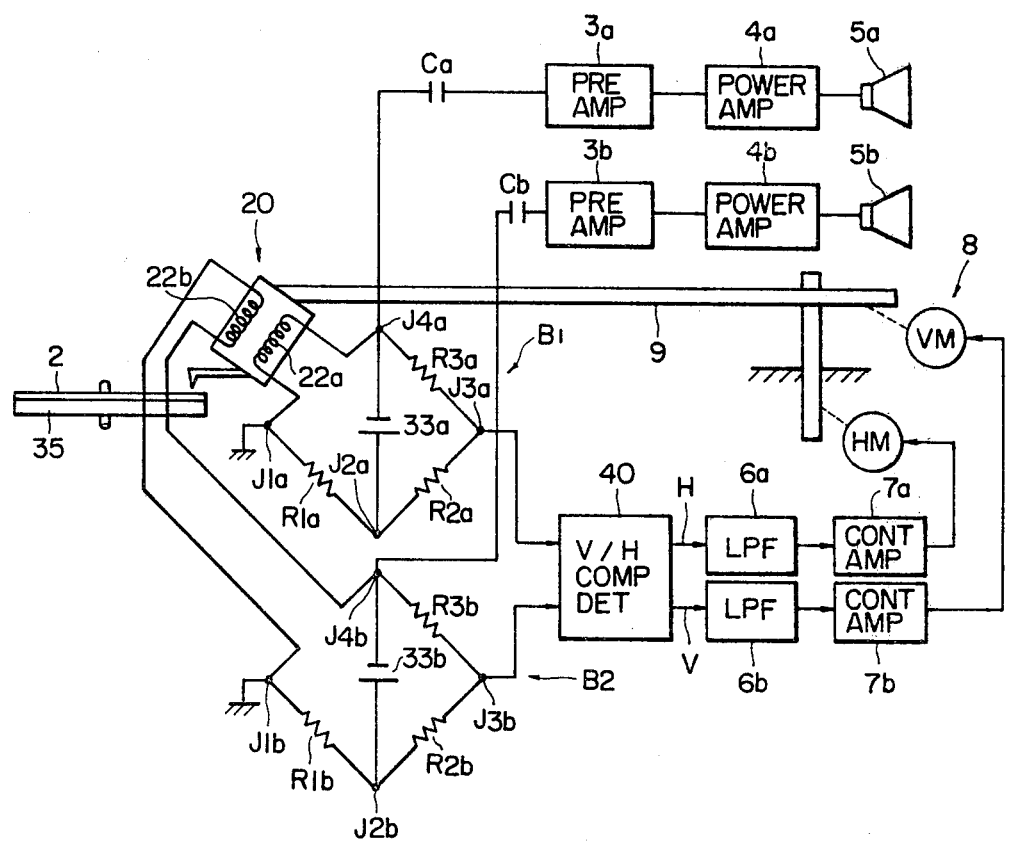
FIG. 2A is a schematic block diagram of an embodiment of the device according to the present invention.

FIG. 2A shows a schematic block diagram of the record player having the device according to the present invention. The record player comprises a turntable 35 for rotating a phonograph disk 2, a tone arm 9 arranged to vertically and horizontally rotate, a pickup 20 positioned at the tip of the tone arm 9, an arm control mechanism 8 for controlling the vertical and horizontal attitudes or angles of the tone arm 9. The arm control mechanism 8 comprises a vertical control motor VM and a horizontal control motor HM. The pickup 20 comprises two moving coils 22a and 22b for the left and right channels. Three resistors R1a through R3a and the moving coil 22a constitute a first bridge circuit B1, while other three resistors R1b through R3b and the other moving coil 22b constitute a second bridge circuit B2. Two D.C. power sources 33a and 33b are shown by way of the symbols of batteries. Since the circuit arrangements of these two bridge circuits B1 and B2 are identical, a description will be given to the first bridge circuit B1. The first resistor R1a is interposed between a first junction J1a connected to ground and a second junction J2 connected to the positive terminal of the D.C. source 33a. The second resistor R2a is interposed between the second junction J2 and a third junction J3 connected to a first input terminal of a vertical/horizontal components detecting cicuit 40. The third resistor R3 is interposed between the third junction J3 and a fourth junction J4 connected to one output terminal of the moving coil 22a of the pickup 20. The fourth junction J4 is futher connected via a capacitor Ca to an input terminal of a left channel preamplifier 3a to feed an audio signal generated by the moving coil 22a thereto. The other terminal of the moving coil 22a is grounded to complete the first bridge circuit B1. The negative terminal of the D.C. source 33a is connected to the fourth junction J4. The vertical/horizontal components detecting circuit 40 comprises a second input terminal connected to the third junction J3b of the second bridge circuit B2 having the same structure as the first bridge circuit B1. The fourth junction J4b of the second bridge circuit B2 is connected via a capacitor Cb to an input terminal of a right channel preamplifier 3b. The output terminals of the left and right channel preamplifiers 3a and 3b are respectively connected to input terminals of left and right channel power amplifiers 4a and 4b whose outputs are connected to left and right channel speakers 5a and 5b in the same manner as in the conventional stereo reproducing system.

Figure 3:
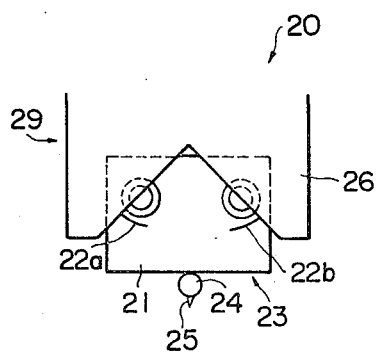
FIG. 3 is a front view of the pickup of FIG. 2A.
Figure 4:
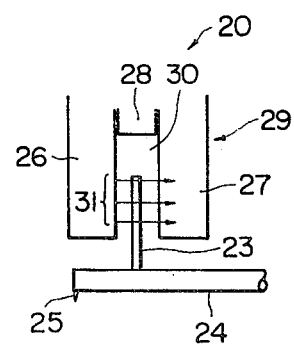
FIG. 4 is a side view of the pickup of FIG. 3.

Reference is now made to FIGS. 3 and 4 which show the structure of the pickup 20 used in the present invention. The pickup 20 comprises two moving coils 22a and 22b for the left and right channels, and the moving coils 22a and 22b are of printed pattern type. In detail, the two coils 22a and 22b are respectively printed on a film-like substrate 21 as shown in FIG. 3. The film-like substrate 21 including the printed coil patterns 22a and 22b is referred to as a micro coil assembly 23. The micro coil assembly 23 is fixed to a cantilever 24 in the vicinity of the stylus 25 positioned at the tip of the cantilever 24. As best seen in FIG. 4, which is a side view of the pickup 20, the micro coil assembly 23 is placed so that the moving coils 22a and 22b move in and out of the magnetic field 30 of a magnetic circuit 29 constructed of a permanent magnet 28 and yokes 26 and 27, in accordance with the motion or vibration of the stylus 25 on reproduction of the phonograph record 2. Magnetic flux is indicated by arrows 31 from the first yoke 26 to the second yoke 27, and the moving coils 22a and 22b move along a plane normal to the direction of the magnetic flux 31 to generate output signals. As seen in FIG. 3, the yokes 26 and 27 has a V-shaped recess so that each of the moving coils 22a and 22b is partially received in the magnetic field 30 between the yokes 26 and 27. The optimum operating position or point of the micro coil assembly 23 with respect to the magnetic circuit 29 is such that approximately half of the entire area of each of the moving coils 22a and 22b is in the magnetic field 30 between the yokes 26 and 27.

The two coils 22a and 22b of the micro coil assembly 23 are different from conventional coils in that these coils 22a and 22b are both made of a substance having magnetoresistance. As substances having magnetoresistance, semiconductor films, whose carrier mobility is high, such as InSb, InAs, and ferromagnetic metallic films, such as Co, Fe and NiCo, are known. However, since the coils 22a and 22b are used as audio signal generating coils, it is necessary that the electical impedance of the substance is low. Accordingly, ferromagnetic metallic films may be used satisfactorily as the substance of the coils 22a and 22b.

Figure 5:
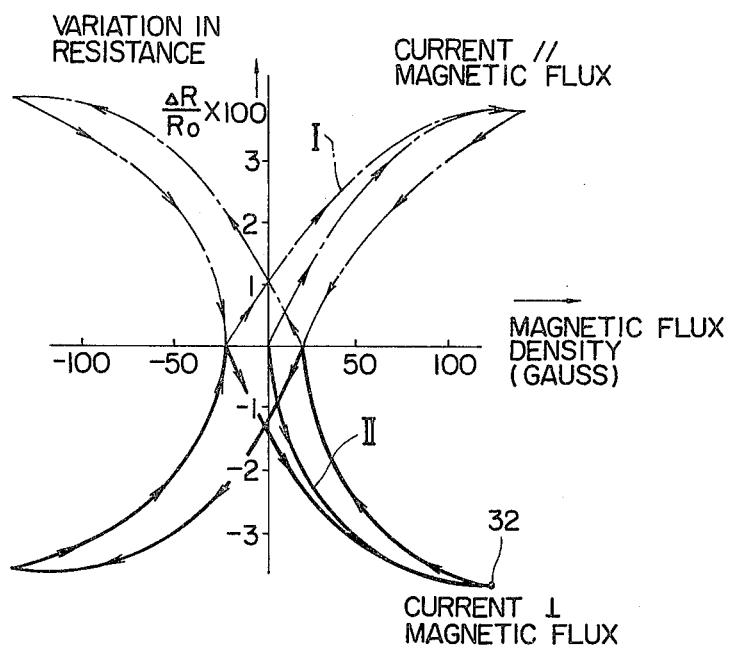
FIG. 5 is a graphical representation showing the resistance variation of a coil made of a substance having magnetoresistance with respect to magnetic flux density.

The operational principle of the micro coil assembly 23 having coils made of a substance having magnetoresistance will be described with reference to FIG. 5 which is a graphical representation of the electric resistance of a film of NiCo, which is one example of the above-mentioned ferromagnetic metallic films, with respect to variation in the magnetic flux density. In the graph of FIG. 5, the abscissa is the magnetic flux density, and the ordinate is the variation in resistance. A symbol of minus (−) in the abscissa indicates that the direction of the magnetic flux is opposite. The reference Ro indicates the resistance of the NiCo film, and the reference ΔR represents the amount of variation in the resistance with respect to a varying magnetic field. The symbols of plus (+) and minus (−) in the ordinate respectively represent the increase and decrease in the amount of variation of the resistance. Two kinds of curves I and II are shown in FIG. 5, and the first curve I shown by a dot-dash curve, is of the case that the direction of the current flow, i.e. the direction of the NiCo film plane, is parallel to the direction of the magnetic flux, and the second curve II shown by a solid curve, is of the case that the direction of the current flow, i.e. the direction of the NiCo film plane, is normal to the direction of the magnetic flux. From the comparison between the first and second curves I and II, it will be understood that the resistance of the NiCo film increases as the magnetic flux density increases when the NiCo film is parallel to the magnetic flux. On the other hand, the resistance of the NiCo film decreases as the magnetic flux density increases when the NiCo film is normal to the magnetic flux.

The curves shown in FIG. 5 are just examples, and the curves may be changed by various techniques. For instance, suitable additives may be added to NiCo; the thickness of the NiCo film may be changed; or anisotoropy may be given to the NiCo film to obtain suitable curves.

Turning back to FIGS. 3 and 4, let us remember that the coils 22a and 22b of the micro coil assembly 23 are arranged such that the direction of the coil plane, i.e. the direction of the current flow, is normal to the magnetic flux 31. For simplicity, the following description is made in connection with the coil 22a. When the coil 22a moves in a direction that the coil 22a enters the magnetic field 30, for instance upwardly in FIGS. 3 and 4, the area of the coil 22a exposed to the magnetic field 30 increases. As a result, the resistance of a portion of the coil 22a, which has been newly entered in the magnetic field 30, lowers along the solid curve II in the fourth quadrant of the graph of FIG. 5. The resistance of the other portions of the coil 22a, which have alreadly been exposed to the magnetic field 30 before, or positioned outside the magnetic field 30, remains unchanged. Since the resistance of the newly entered portion decreases as described in the above, the total resistance of the coil 22a lowers. The point 32 on the solid curve II in FIG. 5 indicates the condition in which the coil 22a has been fully exposed to the magnetic field. On the other hand, when the coil 22a moves in a direction that the coil 22a leaves from the magnetic field 30, the resistance of a coil portion left from the magnetic field 30 increases, and therefore, the total resistance of the magnetic coil 22a increases.

Figure 6:
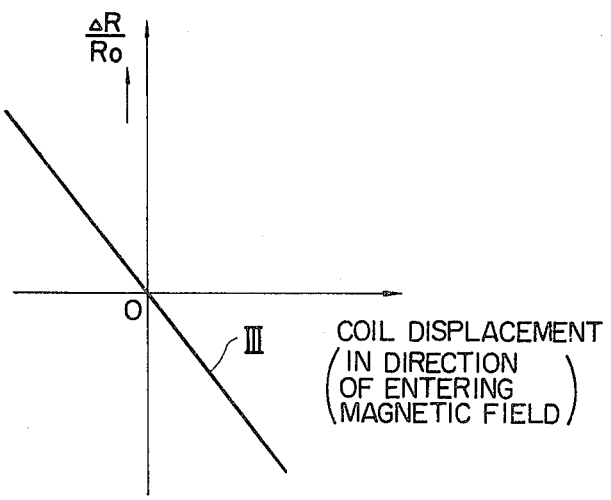
FIG. 6 is a graphical representation showing the relationship between the resistance variation and the of displacement such coil.

FIG. 6 shows the relationship between the displacement of the coils 22a and 22b with respect to the variation in the resistance thereof. When the coil 22a or 22b moves from the optimum operating point indicated at 0 in a direction that the coil 22a or 22b enters the magnetic field 30, the resistance of the coil 22a or 22b decreases substantially linearly. On the contrary, when the coil 22a or 22b moves in the opposite direction that the coil 22a or 22b leaves from the magnetic field 30, the resistance of the coil 22a or 22b increases substantially linearly. From the above, it will be understood that the amount of resistance variation represented by $\Delta R/Ro$ is in proportion to the displacement of the coil 22a or 22b from the optimum operating point. According to the present invention, this relationship is used to accurately detect the position or displacement of the coils 22a and 22b as will be described in detail later. Since the magnetic flux density in the magnetic field 30 is as high as several killo Gausses to ten or more killo Gausses, the resistance of each of the coils 22a and 22b varies with high sensitivity.

The embodiment of the present invention shown in FIG. 2A generally operates in such a way that the displacement of the micro coil assembly 23, which occurs on record playing due to warp and/or eccentricity of the phonograph disk 2, is detected as the variation in the resistance of the coil 22a and 22b, and the tone arm control mechanism 8 is controlled so that $\Delta R/Ro$ becomes zero. As a result, the tone arm angle or attitude is corrected so that the micro coil assembly 23 is correctly positioned with respect to the magnetic field 30 irrespectively of the warp or eccentricity of the disk 2.

The first and second bridge circuits B1 and B2 of FIG. 2A, are provided to detect the varying resistances of the coils 22a and 22b. In detail, the resistances of the resistors R1 through R3 of the first bridge circuit B1 are selected such that the first bridge circuit B1 is in balanced condition when the resistance of the coil 22a assumes a given value indicative of the optimum operating point of the same. In other words, the resistance of the coil 22a is measured first with the coil 22a positioned in the optimum operating position, and then the resistances of R1a through R3a are determined. The resistances R1b through R3b of the second bridge circuit B2 are determined in the same manner as described in the above. When both the first and second bridge circuits B1 and B2 are balanced, the voltage difference between first and third junction points J1a (J1b) and J3a (J3b) is zero.

When playing the phonograph record 2, the moving coils 22a and 22b both made of an NiCo film vibrate in the magnetic field 30 in accordance with the movement of the reproducing stylus 25. As a result of the vibration in the magnetic field 30, each of the coils 22a and 22b generates an output reproducing signal. At this time the resistance of each of the coils 22a and 22b varies because of the effect of magnetoresistance. If the disk 2 has a warp or eccentricity, the micro coil assembly 23 is displaced from the optimum operating point to a large extent. Therefore, a low frequency component corresponding to the displacement of the micro coil assembly 23 is produced and included in the output reproducing signal. Simultaneously, the resistance of each of the coils 22a and 22b varies at a low frequency. It is to be noted that the amount of resistance variation of the coil 22a or 22b is in proportion to the displacement rather than to the moving velocity of the coil 22a or 22b. For this reason, the degree of the resistance variation is adequately large even if the frequency of the resistance variation is low.

The above-mentioned two output reproducing signals, which are respectively developed across the coils 22a and 22b are fed from the fourth juction J4a (J4b) via the capacitor Ca (Cb) to the input terminal of the preapmplifier 3a (3b). The capacitors Ca and Cb are provided for blocking D.C. or low frequency components in the reproducing signals. The left and right channel reproducing signals are then fed respectively to the power amplifiers 4a and 4b which drive the speakers 5a and 5b in the same manner as in the conventional stereo reproducing system.

As the resistance of the coil 22a varies, the first bridge circuit B1 becomes out of balance to develop a D.C. voltage across the first and third junctions J1a and J3a. The second bridge circuit B2 operates in the same manner as the first bridge circuit B1. Namely, the resistance variation of the coil 22a or 22b can be represented by the voltage across the first and third junctions J1a (J1b) and J3a (J3b).

These two voltages, which are referred to as left and right channel voltages, from the first and second bridge circuits B1 and B2, which are representing the displacement of the coils 22a and 22b from their optimum operating points, are used to control the attitude of the tone arm 9. In order to control the vertical and horizontal attitudes or angles of the tone arm 9, the aforementioned vertical control motor VM and the horizontal control motor HM of the arm control mechanism 8 are respectively actuated by the first and second control signals from the first and second control amplifiers 7a and 7b. The first and second control amplifiers 7a and 7b are respectively responsive to output signals of the first and second low pass filters 6a and 6b which receive a vertical output signal V and a horizontal output signal H from the vertical/horizontal components detecting circuit 40. The vertical/horizontal components detecting circuit 40 processes the left and right channel voltages from the first and second bridge circuits B1 and B2 to produce the vertical component output signal and the horizontal component output signal as will be described hereinbelow.

Figure 2B:
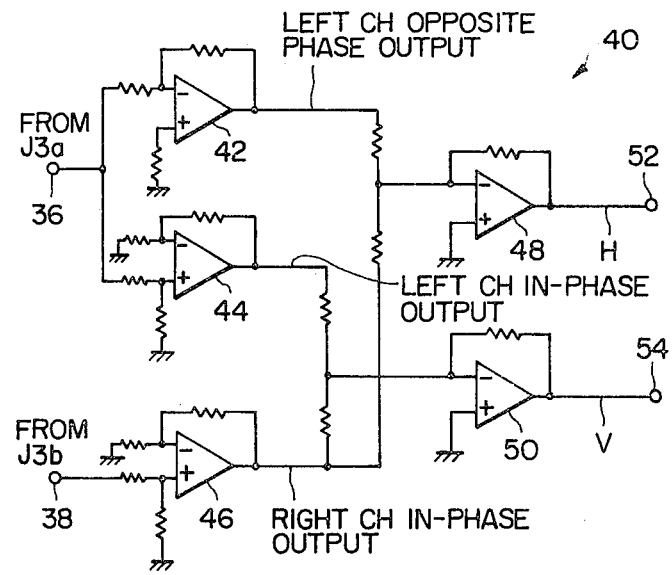
FIG. 2B is a circuit diagram of the vertical/horizontal components detecting circuit of FIG. 2A.

Hence, reference is now made to FIG. 2B which shows a circuit diagram of the vertical/horizontal components detecting circuit 40 of FIG. 2A. The vertical/horizontal components detecting circuit 40 comprises first and second input terminals 36 and 38 respectively connected to the third junctions J3a and J3b of the first and second bridge circuit B1 and B2, first to fifth operational amplifiers 42 to 50, resistors (no numeral) and first and second output terminals 52 and 54. The first input terminal 36, through which the voltage at the third junction J3a of the left channel is applied, is connected via a resistor to an inverting input terminal (−) of the first operational amplifier 42, and via a resistor to a noninverting input terminal (+) of the second operational amplifier 44. The noninverting input terminal (+) of the first operational amplifier 42 is connected via a resistor to ground, while the inverting input terminal (−) of the second operational amplifier 44 is also connected via a resistor to ground. A feedback resistor is interposed between the noninverting input terminal (−) of the first operational amplifier 42 and the output terminal of the same, while another feedback resistor is interposed between the inverting input terminal (−) of the second operational amplifier 44 and its output terminal. With this arrangement, an opposite phase output of the left channel voltage is developed at the output terminal of the first operational amplifier, while an in-phase output of the left channel voltage is developed at the output terminal of the second operational amplifier 42.

The second input terminal 38 is connected to the third operational amplifier in the same manner as the connection between the first input terminal 36 and the second operational amplifier 44. Namely, an in-phase output of the right channel voltage is developed at the output terminal of the third operational amplifier 46. The opposite phase output of the left channel voltage from the first operational amplifier 42 is added to the in-phase output of the right channel voltage from the third operational amplifier 46 through resistors, and the added voltage is applied to the inverting input terminal (−) of the fourth operational amplifier 48. On the other hand, the in-phase output of the left channel voltage from the second operational amplifier 44 is added to the in-phase output of the right channel output voltage from the third operational amplifier 46 through resistors, and the added voltage is applied to the inverting input terminal (−) of the fifth operational amplifier 50. The noninverting input terminals (+) of the fourth and fifth operational amplifiers 48 and 50 are grounded, while a feedback resistor is interposed between the inverting input terminal (−) and the output terminal of each of the fourth and fifth operational amplifiers 48 and 50. The output terminals of the fourth and fifth operational amplifiers 48 and 50 are respectively connected to the first and second output terminals 52 and 54 of the vertical/horizontal components detecting circuit 40.

Accordingly, in-phase and opposite phase outputs of the left and right channel voltages are processed to produce a vertical component voltage and a horizontal component voltage from the output voltages of the first and second bridges B1 and B2 in FIG. 2A. As will be understood from FIG. 3, when the micro coil assembly 23 moves upward, both the moving coils 22a and 22b move further into the magnetic field 30. Therefore, the resistances of the coils 22a and 22b decrease. On the other hand, when the micro coil assembly 23 moves horizontally, the moving coils 22a and 22b move in a direction that one of the coils 22a and 22b futher enters the magnetic field 30 and the other coil leaves from the magnetic field 30. Accordingly, the resistance of the entering coil 22a or 22b decreases, while the resistance of the other leaving coil 22b or 22a increases.

Since the left channel voltage and the right channel voltage are added to each other at the input terminal of the fourth operational amplifier 48 in such a manner that their phases are opposite to each other, the output voltage of the fourth operational amplifier 48 represents the horizontal displacement of the moving coils 22a and 22b. On the other hand, since the left and right channel output voltages are added to each other at the input terminal of the fifth operational amplifier 50 in such a manner that their phases are equal to each other, the output voltage of the fifth operational amplifier 50 represents the vertical displacement of the moving coils 22a and 22b.

The output voltages of the vertical/horizontal components detecting circuit 40 are respectively fed via the first and second low pass filters 6a and 6b to the first and second control amplifiers 7a and 7b as described in the above so that the horizontal control motor HM and the vertical control motor VM are respectively driven by the output currents from the first and second control amplifiers 7a and 7b. The cutoff frequency fc of the low pass filter 6 is set as, for instance, fc=20 Hz, so that reproduced signal components corresponding to the audio information from the sound groove of the disk 2 are rejected. Namely, only low frequency components corresponding to the warp and/or eccentricity of the phonograph disk 2 are applied to the control amplifiers 7a and 7b. Each of the control amplifiers 7a and 7b comprises a D.C. amplifier which generates the abovementioned motor driving current.

The horizontal control motor HM and the vertical control motor VM are respectively actuated in the same manner as in the conventional arrangement so that the position of the cantilever 24 is controlled in such a manner that the coils 22a and 22b of the micro coil assembly 23 are positioned at the optimum operating point. Since the displacement of the micro coil assembly 23 from the optimum operating point can be accurately detected irrespectively of the moving speed of the micro coil assembly 23, the first and second control amplifiers 7a and 7b are capable of producing their output control signals or driving currents whose magnitude is sufficient for satisfactorily controlling the vertical and horizontal positions of the tone arm 9.

The micro coil assembly 23 is controlled to be positioned at the optimum operating point thereof in this way, and therefore, the moving coils 22a and 22b can generate left and right channel reproducing signals under the condition that the coils 22a and 22b vibrate centering the optimum operating point thereof. Consequently, desired reproduced sounds without distortion due to the stylus displacement can be stably obtained.

It should be noted that the coils 22a and 22b function not only as generating coils for picking up audio signals from the sound grooves of the disk 2 but also as resistance elements, from which information indicative of the displacement of the coils 22a and 22b can be derived, because each of the coils 22a and 22b is made of a substance having magnetoresistance. Therefore, it is possible to manufacture the pickup without increasing the effective mass of the vibrating system thereof.

Although the embodiment of the present invention has been described in connection with a pickup of printed pattern coil type, the present invention may also be adapted to a pickup of wound coil type. Furthermore, the way of adding the left and right channel voltages from the first and second bridge circuits B1 and B2 described with reference to FIG. 2B may be substituted with other ways.

From the foregoing description, it will be understood that the micro coil assembly 23 of the moviging coil type pickup 20 can be positioned at the optimum operating point irrespective of the warp and/or eccentricity of the phonograph disk 2 even if the movement or fluctuation of the micro coil assembly 23 is very low in velocity. Although the vertical and horizontal attitudes or angles of the tone arm 9 are controlled in the above-described embodiment, the tone arm 9 may be controlled in one direction only. For instance, the tone arm 9 may be controlled in the vertical direction to correct the discplacement of the micro coil assembly 23 due to warp. In this case the second low pass filter 6b, the second control amplifier 7b and the horizontal control motor HM are not needed, and therefore the control device can be manufactured at a lower cost. The above-described embodiment is just an example of the present invention, and therefore, it will be apparent for those skilled in the art that many modifications and variations may be made without departing from the spirit of the present invention.

What is claimed is:

1. A device for controlling a tone arm carrying a moving coil type pickup, comprising:
    (a) a moving coil assembly having left and right channel moving coils arranged to move in a magnetic field in accordance with the displacement of a cantilever having a stylus which traces the surface of a phonograph record, each of said moving coils being made of a magnetoresistance material;
    (b) a tone arm vertically and horizontally rotatably mounted on a stationary member, said tone arm carrying said moving coil assembly;
    (c) a tone arm control mechanism for controlling the vertical and/or horizontal attitude of said tone arm;
    (d) first means for detecting a variation in the electrical resistance of said left channel moving coil passing through the magnetic field;
    (e) second means for detecting a variation in the electrical resistance of said right channel moving coil passing through the magnetic field;
    (f) third means responsive to the detected variations in electrical resistances from said first and second means for generating a vertical component output signal indicative of a vertical displacement of said moving coil assembly and/or a horizontal component output signal indicative of a horizontal displacement of said moving coil assembly; and
    (g) fourth means responsive to said vertical component output signal and/or horizontal component output signal for generating a vertical control signal and/or a horizontal control signal which are/is applied to said tone arm control mechanism for controlling the vertical and/or horizontal attitude(s) of said tone arm so that each of said left and right channel moving coils is positioned at an optimum operating point with respect to said magnetic field.

2. A device as claimed in claim 1, wherein each of said first and second means comprises three resistors forming a bridge circuit together with said moving coil, and a D.C. power source for feeding said bridge circuit with a constant voltage, the left channel bridge circuit producing a left channel voltage when unbalanced and the right channel bridge circuit producing a right channel voltage when unbalanced.

3. A device as claimed in claim 1, wherein said third means comprises fifth means for producing said vertical component output signal by adding said left channel voltage from said left channel bridge circuit to said right channel voltage from said right channel bridge circuit in such a manner that the left and right channel voltages are in phase with each other, and sixth means for producing said horizontal component output signal by adding said left channel voltage to said right channel voltage in such a manner that the left and right channel voltages are opposite in phase with each other.

4. A device as claimed in claim 1, wherein said fourth means comprises a first low pass filter for transmitting only low frequency components of said vertical component output signal of said third means, a first control amplifier responsive to said low frequency component from said first low pass filter for producing said vertical control signal, a second low pass filter for transmitting only low frequency components of said horizontal component output signal of said third means, and a second control amplifier responsive to said low frequency component from said second low pass filter for producing said horizontal control signal.

5. A device as claimed in claim 1, wherein said tone arm control mechanism comprises a vertical control motor responsive to said vertical control signal for controlling the vertical attitude of said tone arm, and a horizontal control motor responsive to said horizontal control signal for controlling the horizontal attitude of said tone arm.

6. A device as claimed in claim 1, wherein said moving coils are made of NiCo.

7. A device as claimed in claim 1, wherein said moving coils are made of Co.

8. A device as claimed in claim 1, wherein said moving coils are made of Fe.

* * * * *